US011875119B2

(12) United States Patent
Hwang et al.

(10) Patent No.: US 11,875,119 B2
(45) Date of Patent: Jan. 16, 2024

(54) MEMORY-BASED REINFORCEMENT LEARNING METHOD FOR STORING OPTIONAL INFORMATION IN STREAMING DATA AND SYSTEM THEREFORE

(71) Applicant: Korea Advanced Institute of Science and Technology, Daejeon (KR)

(72) Inventors: Sung Ju Hwang, Daejeon (KR); Moonsu Han, Daejeon (KR); Minki Kang, Daejeon (KR); Hyunwoo Jung, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 408 days.

(21) Appl. No.: 17/179,178

(22) Filed: Feb. 18, 2021

(65) Prior Publication Data
US 2021/0263859 A1    Aug. 26, 2021

(30) Foreign Application Priority Data

Feb. 19, 2020  (KR) ........................ 10-2020-0020160
Dec. 9, 2020   (KR) ........................ 10-2020-0171181

(51) Int. Cl.
*G06F 16/215*   (2019.01)
*G06N 3/0442*   (2023.01)
*G06N 5/00*     (2023.01)
*G06F 40/30*    (2020.01)
*G06N 20/00*    (2019.01)
(Continued)

(52) U.S. Cl.
CPC ............ *G06F 40/30* (2020.01); *G06F 18/217* (2023.01); *G06N 20/00* (2019.01); *G06V 10/776* (2022.01)

(58) Field of Classification Search
USPC ............ 382/154–159; 704/1–275; 706/1–62, 706/900–903; 707/707–780
See application file for complete search history.

(56) References Cited

U.S. PATENT DOCUMENTS

2014/0068351 A1*  3/2014  Rhee ................... G06F 11/3034
                                                        714/47.3
2017/0177711 A1*  6/2017  Thomas .............. G06F 16/1805
2020/0175364 A1*  6/2020  Xu ......................... G06N 3/045
(Continued)

OTHER PUBLICATIONS

Moonsu Han et al., Episodic Memory Reader: Learning What to Remember jor Question Answering fromm Streaming Data; Mar. 2019 (Year: 2019).*

(Continued)

*Primary Examiner* — Marcellus J Augustin
(74) *Attorney, Agent, or Firm* — Burns & Levinson, LLP; Joseph M. Maraia

(57) ABSTRACT

Provided is a memory-based reinforcement learning method and system capable of storing optional information in streaming data. A question-answering (QA) method using memory-based reinforcement learning method includes receiving, in an episodic memory reader (EMR), streaming data about an input context that is input from a user; analyzing, in the EMR, the received streaming data and storing preset semantic information used for QA in an external memory; and, in response to an input of a question front the user, determining, in a pretrained QA model, an answer to the input question based on semantic information stored in the external memory.

10 Claims, 5 Drawing Sheets

(51) Int. Cl.
*G06F 18/21* (2023.01)
*G06V 10/776* (2022.01)

(56) References Cited

U.S. PATENT DOCUMENTS

2020/0285940 A1* 9/2020 Sprechmann .......... G06N 3/006
2021/0201192 A1* 7/2021 Kim ....................... G06N 3/045
2022/0343082 A1* 10/2022 Lee ......................... G06N 5/04

OTHER PUBLICATIONS

Jung et al., Learning What to Remember: Long-Term Episodic Memory Networks for Learning From Streaming Data ; Dec. 2018 (Year: 2018).*
Moonsu Han, et al., "Episodic Memory Reader: Learning What to Remember for Question Answering from Streaming Data," *Computer Science-Machine Learning*, 19 pages (Mar. 14, 2019).
Kumar et al., "Ask Me Anything: Dynamic Memory Networks for Natural Language Processing," The Proceedings of the 33rd International Conference on Machine Learning, 10 pages (2016).
Jung et al., "Learning What to Remember: Long-term Episodic Memory Networks for Learning from Streaming Data," 10 pages (Dec. 2018).
Request for Submission of an Opinion issued in co-pending Korean Patent Application No. 10-2020-0171181, dated Aug. 15, 2022.

* cited by examiner

MEMORY-BASED REINFORCEMENT LEARNING METHOD FOR STORING OPTIONAL INFORMATION IN STREAMING DATA AND SYSTEM THEREFORE

CROSS-REFERENCE TO RELATED APPLICATION

This application claims the priority benefit of Korean Patent Application No. 10-2020-0020160, filed on Feb. 19, 2020, and Korean Patent Application No. 10-2020-0171181, filed on Dec. 9, 2020, in the Korean Intellectual Property Office, the disclosure of which is incorporated herein by reference.

BACKGROUND

1. Field of the Invention

The following description of example embodiments relates to memory-based reinforcement learning technology capable of storing optional information in streaming data and more particularly, to a memory-based reinforcement learning method and system that may read/write a large amount of data without being limited by hardware by providing a memory-based reinforcement learning model capable of storing optional information in streaming data.

2. Description of the Related Art

The rapid progress in question-answering (QA) in recent years is attributed to availability of large datasets as well as advance in deep learning. One of the most popular large-scale QA datasets is Stanford Question Answering Dataset (SQUAD) that includes 100K QA pairs. Unlike the related art that provides multiple-choice QA pairs, SQuAD needs to provide and predict an exact location of an answer. On this span prediction task, attentional models have achieved impressive results with Bi-Directional Attention Flow (BiDAF) that uses bi-directional attention mechanism for context and query. Trivia QA is another large-scale QA dataset that includes 950K QA pairs. Since each document in Trivia has a length with average of 3K sentences per document, which is much longer than that of SQuAD. Therefore, existing span prediction models do not work due to memory limitation and simply depend on document truncation. Video QA in which video frames are given as a context for QA is another important topic in which scalability is an issue. Although several conventional models propose to solve video QA using attentions and memory enhancement networks to perform composite reasoning over videos and texts, they only focus on short-length videos. Most of the existing work on QA focuses on small-scale issues due to memory limitation.

A few recent models propose to select a minimal context from a given document when answering questions for salability, rather than using the full context. In one related art, proposed is a context selector that generates attentions on context vectors to achieve scalability and robustness against adversarial inputs. In another related art, proposed is a similar method that uses REINFORCE instead of a linear classifier. In still another related art, proposed is to select a most relevant document from a Wikipedia database with respect to a query using TF-IDF matching. In still another art, proposed is to solve a document ranking problem with RL agents. The above context/document selection methods share a motivation of achieving scalability and selecting most informative pieces of information to solve a QA task.

A memory-augmented neural network (MANN) basically relates to using an RL-based scheduler. While most existing work on the MANN assumes that a memory is sufficiently large to hold all the data instances, a few tried to consider memory scheduling for better scalability. In one related art, proposed is to train an addressing agent using reinforcement learning to dynamically determine a memory to overwrite based on a query. Differentiable Neural Computer (DNC) that is another related art extends an NTM to address a full memory issue by replacing a least used memory when the memory becomes full. However, this method is a rule-based method incapable of maximizing performance on a given task.

SUMMARY

Example embodiments provide a memory-based reinforcement learning method and system that may read/write a large amount of data without being limited by hardware by providing a memory-based reinforcement learning model capable of storing optional information in streaming data.

According to an aspect of example embodiments, there is provided a question-answering (QA) method using memory-based reinforcement learning, the method including receiving, in an episodic memory reader (EMR), streaming data about an input context that is input from a user; analyzing, in the EMR, the received streaming data and storing preset semantic information used for QA in an external memory; and, in response to an input of a question from the user, determining, in a pretrained QA model, an answer to the input question based on semantic information stored in the external memory.

The storing may include encoding each data instance including the streaming data to a memory vector representation, acquiring relative importance with data stored in the external memory using the encoded memory vector representation, and, in response to the acquired relative importance being higher than specific data stored in the external memory, replacing the specific data with data about the semantic information and storing the replaced data.

The storing may include, in response to an empty memory entry of the external memory, mapping and storing the semantic information to the empty memory entry, and, in response to a full memory entry of the external memory, computing relative importance between the semantic information and data stored in the external memory and replacing specific data stored in a memory entry corresponding to lowest relative importance compared to the semantic information with the semantic information and storing the replaced semantic data.

The storing may include computing a replacement probability between the semantic information and each memory entry of the external memory based on a preset memory scheduling agent policy and replacing data stored in one of memory entries with the semantic information based on the computed replacement probability and storing the replaced semantic information.

The storing may include storing the semantic information in the external memory through a reinforcement learning model that is trained through reinforcement learning using a preset training dataset.

According to another aspect of example embodiments, there is provided a question-answering (QA) method using memory-based reinforcement learning, the method including receiving, in an episodic memory reader (EMR), streaming data about an input context that is input from a user; analyzing, in the EMR, the received streaming data and acquiring preset semantic information used for QA, and replacing a single piece of specific data of data stored in an external memory with the semantic information and storing the replaced semantic information; and, in response to an input of a question from the user, determining, in a pretrained QA model, an answer to the input question based on semantic information stored in the external memory.

According to still another aspect of example embodiments, there is provided a question-answering (QA) system using memory-based reinforcement learning, the system including a receiver configured to receive, in an episodic memory reader (EMR), streaming data about input context that is input from a user; a storage configured to analyze, in the EMR, the received streaming data and store preset semantic information used for QA in an external memory; and a determiner configured to, in response to an input of a question from the user, determine, in a pretrained QA model, an answer to the input question based on semantic information stored in the external memory.

The storage may be configured to encode each data instance including the streaming data to a memory vector representation, to acquire relative importance with data stored in the external memory using the encoded memory vector representation, and to, in response to the acquired relative importance being higher than specific data stored in the external memory, replace the specific data with data about the semantic information and store the replaced data.

The storage may be configured to, in response to an empty memory entry of the external memory, map and store the semantic information to the empty memory entry, and to, in response to a full memory entry of the external memory, compute relative importance between the semantic information and data stored in the external memory and replace specific data stored in a memory entry corresponding to lowest relative importance compared to the semantic information with the semantic information and store the replaced semantic data.

The storage may be configured to compute a replacement probability between the semantic information and each memory entry of the external memory based on a preset memory scheduling agent policy and to replace data stored in one of memory entries with the semantic information based on the computed replacement probability and store the replaced semantic information.

The storage may be configured to store the semantic information in the external memory through a reinforcement learning model that is trained through reinforcement learning using a preset training dataset.

According to still another aspect of example embodiments, there is provided a question-answering (QA) method using memory-based reinforcement learning, the method including receiving, in an episodic memory reader (EMR), streaming data about an input context that is input from a user; analyzing, in the EMR, the received streaming data and storing preset semantic information used for QA using a reinforcement learning model that is trained through reinforcement training using a preset training dataset; and, in response to an input of a question from the user, determining, in a pretrained QA model, an answer to the input question based on semantic information stored in the external memory.

According to some example embodiments, it is possible to read/write a large amount of data without being limited by hardware by providing a memory-based reinforcement learning model capable of storing optional information in streaming data.

According to some example embodiments, since semantic information in a large amount of data provided from a user is stored in a memory, it is possible to use the semantic information for a conversation model interactable with the user in real time and since data is input in a streaming manner, it is possible to process data regardless of an amount of data and to effectively use a hardware memory.

According to some example embodiments, in the case of developing a model that interacts with a user in real time in the future or a model that requires real-time data processing, a proposed model may be used not only for graphics processing unit (GPU)-based hardware but also an edge-device. For example, the example embodiments may be applicable in the field of providing an artificial intelligence (AI)-based real-time service and may perform effective memory use and driving using the proposed model in an edge-device environment in which hardware performance is limited. Also, in a conversation model interactable with the user in real time, the example embodiments may be applicable as technology capable of effectively processing a large amount of data provided from the user. Also, by storing related information in a memory based on a characteristic of an individual user through coupling with gradual learning, the example embodiments may apply to a personalized conversation model or device, for example, home automation and Internet of things (IoT).

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
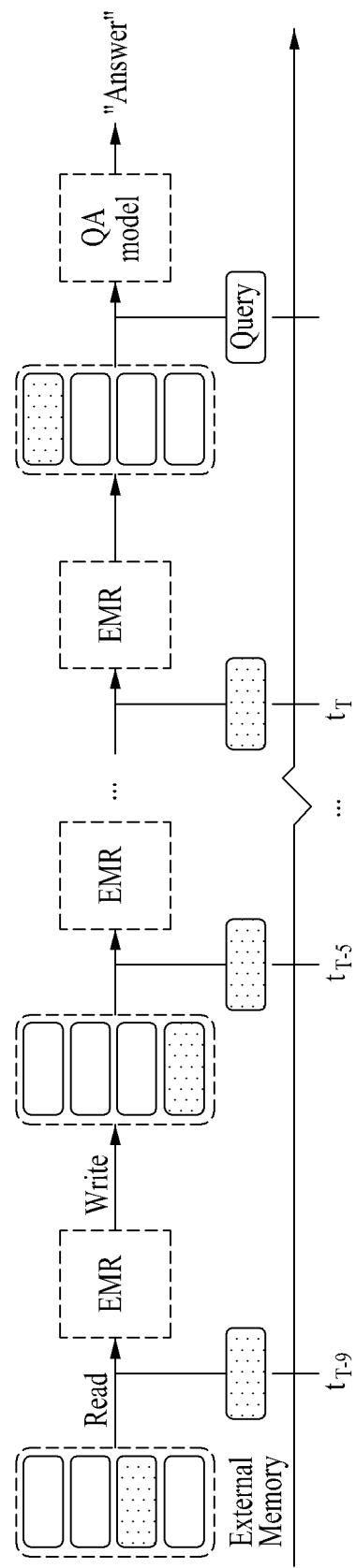
FIG. 1 illustrates an example of describing an episodic memory reader (EMR) according to an example embodiment.

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

The terminology used herein is for describing various example embodiments only, and is not to be used to limit the disclosure. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers; steps, operations, elements, components and/or groups thereof.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component, without departing from the scope of the disclosure.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

A question-answering (QA) problem is one of the most important challenges in natural language understanding (NLU). In recent years, drast progress has been made on the above topic owing to a success of deep learning-based QA models. On certain tasks, such as machine reading comprehension (MRC) in which a problem is to find the span of answers within a given paragraph, the deep learning-based QA models have even sur-passed human-level performance.

Despite the above achievement, it is still difficult to model question answering with document-level context that may include a long document with a large number of paragraphs due to difficulty in modeling long-term dependency modeling and computational cost. To overcome the above scalability issue, pipeline or confidence-based selection methods of combining paragraph-level models to acquire a document-level model are proposed in the related arts. Such models are applicable only when questions are given in advance and all sentences in a document is storable in a memory. However, in realistic settings, a context amount may be too large to fit into a system memory.

Although query-based context selection methods may be considered herein, a question may not be given when reading in the context in many cases, and thus it may be difficult to select the context based on the question. For example, a conversation agent may need to answer a question after numerous conversations over a long-term period of time and a video QA model may need to view the entire movie, a sports game, or days of streaming videos from a security camera before answering the question. In this case, existing QA models may fail in solving a problem due to memory limitation.

Example embodiments provide a novel end-to-end deep network model for reading comprehension that is referred to as an episodic memory reader (EMR) configured to sequentially read input contexts into an external memory, while replacing memories that are less important for answering unseen questions.

In detail, the example embodiments train a RL agent of replacing a memory entry to maximize its QA accuracy at a future timepoint while encoding the external memory using a Gated Recurrent Unit (GRU) or a transformer architecture to learn representations that consider relative importance between memory entries.

Herein, targeted is a novel problem of solving a QA problem with streaming data as a context in which a size of the context may be significantly larger than an accommodation size of a memory as illustrated in FIG. 1. In this case, a model needs to carefully manage what to remember from streaming data such that a most informative context instance may be stored in the memory to answer an unseen question in the future. Herein, a memory management problem is suggested as a learning problem and both a memory representation and a scheduling agent are trained using reinforcement learning. That is, referring to FIG. 1, the example embodiments consider a novel problem of learning from streaming data in which a QA model may need to answer a question that is given after reading in an unlimited amount of context. To solve this, the EMR learns to retain most important context vectors in an external memory, while replacing a memory entry to maximize its accuracy on an unseen question given at a future timestep.

In detail, proposed herein is to train a memory module itself using reinforcement learning to replace a most uninformative memory entry to maximize a reward on a given task. However, it may be a seemingly ill-posed problem since scheduling needs to be performed without knowing a next question in most cases.

To solve this, a policy network and a value network that learn relative importance between sentences as well as a relation between the sentences and a query to maximize question answering accuracy at a future timepoint. The above network is referred to as an episodic memory reader (EMR). Here, the EMR may perform selective memorization to maintain a compact set of important contexts that may be useful for future tasks in lifelong learning scenarios. The EMR herein may be a memory-augmented neural network (MANN) that basically uses an RL-based scheduler.

The example embodiments may apply the proposed memory network on a large-scale QA task (TriviaQA) and video question answering task (TVQA) in which a context is too large to fit into the external memory against a rule-based and an RL-based scheduling method without consideration of relative importance between memories.

The contribution of the example embodiments may be as follows:
1) Herein, considered is a novel task of learning to remember important instances from streaming data for a QA task in which a size of a memory is significantly smaller than a length of a data stream.
2) Herein, proposed is a novel end-to-end memory-augmented neural architecture for solving QA from streaming data. Here, a scheduling agent is trained through reinforcement learning to store a most important memory entry for solving a future QA task.

Herein, a challenging scenario in which a context is order of magnitude larger than a memory may be considered. A problem setting of the example embodiment may be completely different from that of the related arts since a challenging problem of learning from streaming data is considered without knowing when a question is given in a situation which a size of the context is much larger than a memory and the question is unseen when training a selection module.

The example embodiments describe a method of solving a QA task with streaming data as a context. In a more general sense, this is a problem of learning from a long data stream that includes a large portion of unimportant, noisy data, for example, routine greetings in conversations and uninformative video frames, with a limited memory. The data stream refers to an episodic manner in which an unlimited amount of data instances may arrive at one time interval and becomes inaccessible afterward. Additionally, referring to FIG. 1, considered is that the model may not know in advance what task, for example, a question in the case of a QA problem, will be given at which timestep in the future.

To solve this issue, the model needs to identify an important data instance from the data stream and to store the identified important data instance in the external memory. Formally, given a data stream (e.g., sentences or images) $X=\{x^{(1)}, \ldots, x^{(T)}\}$ where $x^{(t)} \in R^d$ as input, the model needs to learn a function $F:X \rightarrow M$ of mapping it to a set of memory entries $M=\{m_1, \ldots, m_M\}$ where $m_i \in R^k$ and $T >> N$. Here, there is a problem regarding a method of learning such a function of maximizing performance on unseen future tasks without knowing what problems will be give at what time. Herein, the problem may be formulated as a reinforcement learning problem to train a memory scheduling agent.

Figure 2:
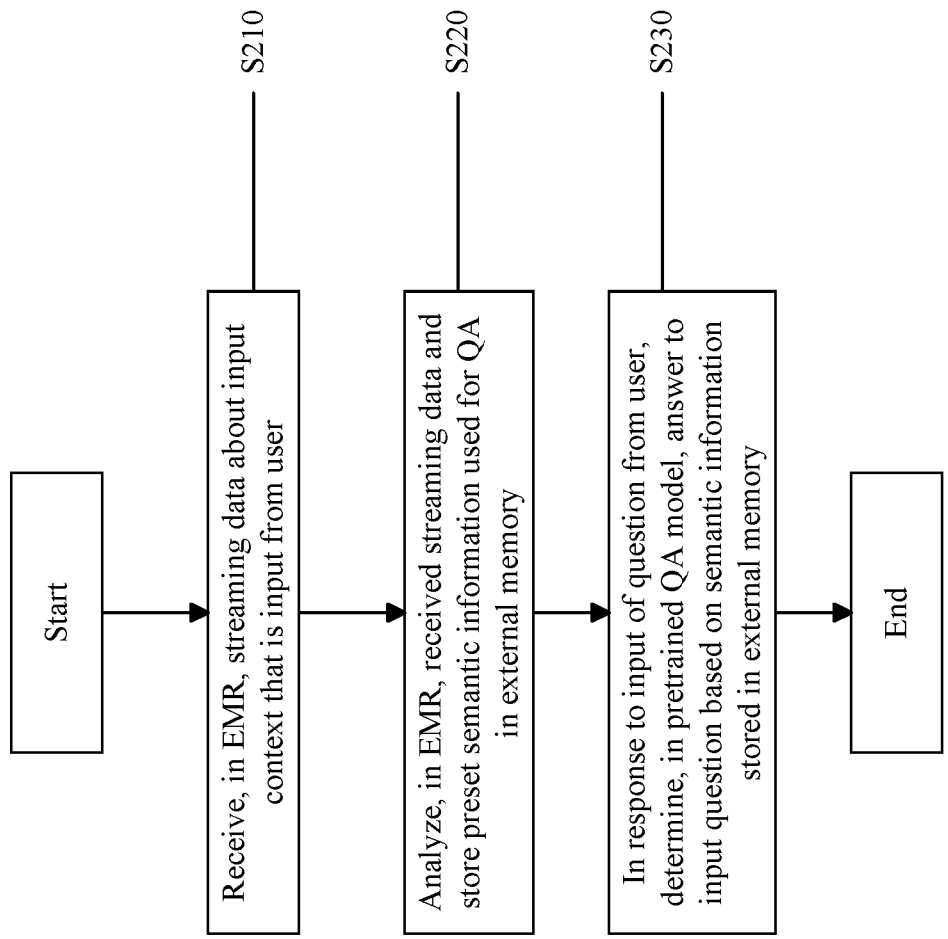
FIG. 2 is a flowchart illustrating an example of a question-answering (QA) method using memory-based reinforcement learning according to an example embodiment.

FIG. 2 is a flowchart illustrating an example of a QA method using memory-based reinforcement learning according to an example embodiment.

Referring to FIG. 2, the QA method according to an example embodiment may include operation S210 of receiving, in an EMR, streaming data about an input context that is input from a user, operation S220 of analyzing, in the EMR, the received streaming data and storing preset semantic information for QA in an external memory, and operation S230 of, in response to an input of a question from the user, determining, in a pretrained QA model, an answer to the input question based on semantic information stored in the external memory.

Here, the semantic information may include a context capable of performing QA, and may include, for example, user information capable of solving a future question of the user in a conversation situation.

Operation S220 may include encoding each data instance including the streaming data to a memory vector representation, acquiring relative importance with data stored in the external memory using the encoded memory vector representation, and, when the acquired relative importance is higher than specific data stored in the external memory, replacing the specific data with data about the semantic information and storing the replaced data.

Also, operation S220 may include, when a memory entry of the external memory is empty, mapping and storing the semantic information to the empty memory entry, and, when the memory entry of the external memory becomes full, computing relative importance between the semantic information and data stored in the external memory and replacing specific data stored in a memory entry corresponding to lowest relative importance compared to the semantic information with the semantic information and storing the replaced semantic data.

Also, operation S220 may include computing a replacement probability between the semantic information and each memory entry of the external memory based on a preset memory scheduling agent policy and replacing data stored in one of memory entries with the semantic information based on the computed replacement probability and storing the replaced semantic information.

Also, operation S220 may include storing the semantic information in the external memory through a reinforcement learning model that is trained through reinforcement learning using a preset training dataset.

Hereinafter, the QA method according to an example embodiment is further described with reference to FIGS. 3 and 4.

Model Overview

A model, EMR, proposed herein to solve the aforementioned problem is described as follows. The model includes three components: (1) an agent A based on EMR, (2) an external memory $M=[m_1, \ldots, m_N]$, and (3) a solver that solves a given task (e.g., QA) with the external memory.

Figure 3:
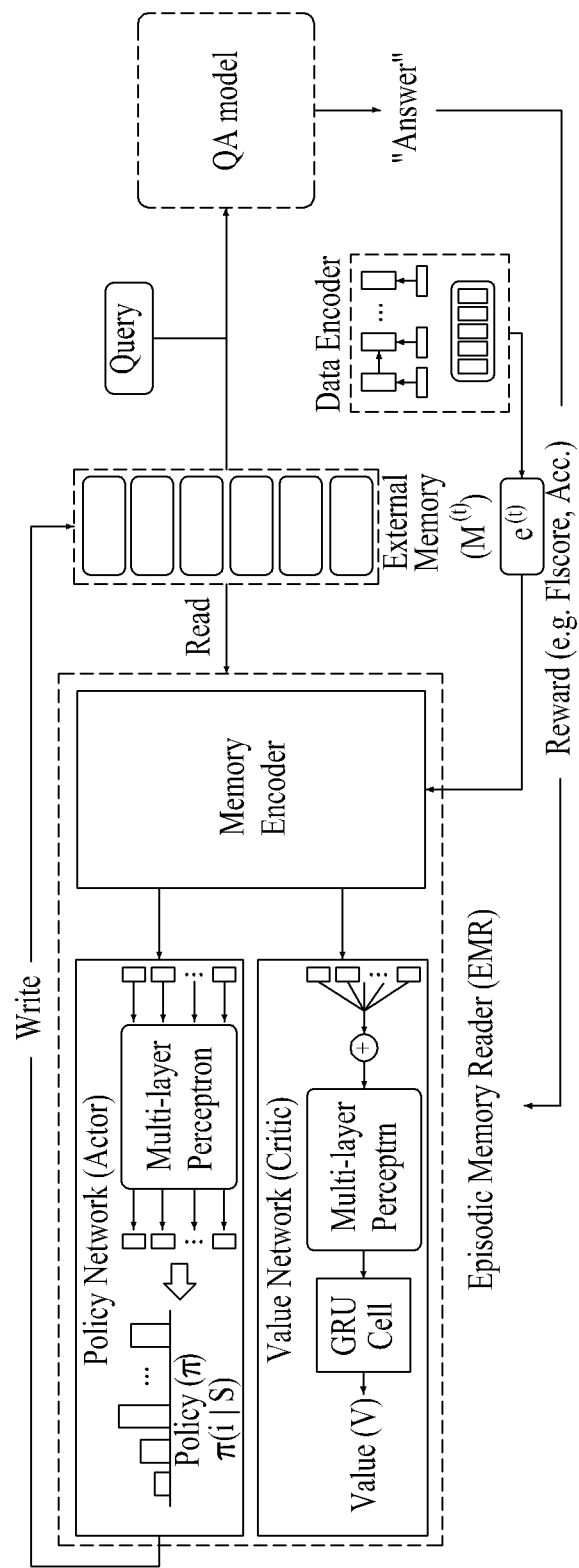
FIG. 3 illustrates an example of overview of an EMR according to an example embodiment.
Figure 4:
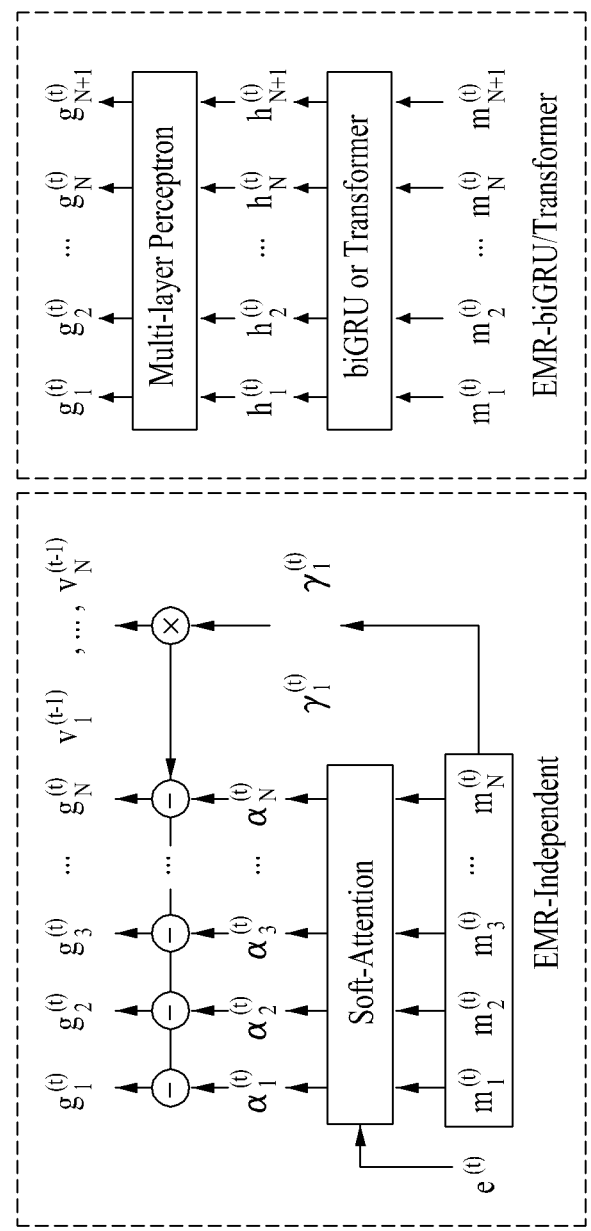
FIG. 4 illustrates an example of an architecture of a memory encoder according to an example embodiment.

FIG. 3 illustrates an example of overview of an EMR according to an example embodiment, Basically, given a sequence of data instances $X=\{x^{(1)}, \ldots, x^{(T)}\}$ that streams through a system, an agent learns to retain a most useful subset in a memory through interaction with an external memory that encodes relative importance of each memory entry. When $t \leq N$, the agent simply maps $x^{(t)}$ to $m^{(t)}$. However, when $t > N$, the agent selects an existing memory entry to delete when the memory becomes full. In detail, the agent outputs an action based on $\pi(j|S^{(t)})$, which denotes a selection of an aril memory entry to delete, Here, a state is a concatenation of the memory and the data instance $S^{(t)}=[M^{(t)}, e^{(t)}]$. Here, $e^{(t)}$ denotes an encoded input at a timestep t. To maximize performance on a future QA task, the agent needs to replace a least important memory entry. When the agent encounters a task T (QA problem) at a timestep T+1, the agent may solve the task using both the memory at a timestep T, $M^{(T)}$ and task information, for example, question. For each action, an environment (QA module) may provide a reward $R^{(t)}$ that is given as an F1-score or accuracy.

Episodic Memory Reader (EMR)

The EMR includes three components: (1) a data encoder configured to encode each data instance to a memory vector representation, (2) a memory encoder configured to generate a replacement probability for each memory entry, and (3) a value network configured to estimate a memory value as a whole. In some cases, a policy gradient method may be used and, in this case, the value network may be unnecessary.

Describing the data encoder, a data instance $x^{(t)}$ that arrives at a time t may be in any data format, and thus may be transformed to a k-dimensional memory vector representation $e^{(t)} \in R^k$ using the data encoder. Here, the memory vector representation may be represented as the following Equation 1.

$$e^{(t)} = \psi(x^{(t)}) \qquad \text{[Equation 1]}$$

In Equation 1, $\psi(\bullet)$ denotes the data encoder that may be any neural architecture based on a type of input data. For example, if $x^{(t)}$ includes sequential data (e.g., words $x^{(t)}=\{w_1, w_2, w_3, \ldots w_s\}$), a recurrent neural network (RNN) may be used. Alternatively, if $x^{(t)}$ is an image, a convolutional neural network (CNN) may be used. After deleting a memory entry $m_i^{(t)}$, $e^{(t)}$ may be appended at the end of the memory, which then becomes $m_N^{(t+1)}$.

Describing the memory encoder, using memory vector representations $M^{(t)}=[m_1^{(t)}, \ldots m_N^{(t)}]$ and $e^{(t)}$ generated from the data encoder, the memory encoder may output a probability for each memory entry based on the relative importance and then replace a most unimportant entry. This component corresponds to a policy network of an actor-critic method.

EMR-Independent: Since existing work for a novel problem setting is absent, a memory encoder that only captures relative importance of each memory entry independently to a new data instance is considered herein. Herein, the memory encoder may be referred to as EMR-independent. Such scheduling mechanism is adopted from Dynamic Least Recently Use (LRU) addressing that is introduced in the related art, but differs from LRU in that it replaces the memory entry rather than overwriting the memory entry and is trained without a query, to maximize the performance for unseen future queries. EMR-Independent may output the importance for each memory entry through comparison to embedding of a new data instance $x^{(t)}$ as $a_i^{(t)}$=softmax($mi^{(t)}\psi(x^{(t)})^T$. To compute the overall importance of each memory entry, an exponential moving average may be computed as $v_i^{(t)}=0.1v_i^{(t-1)}+0.9a_i^{(t)}$. Then, a replacement probability of each memory entry may be computed with an LRU factor $\gamma^{(t)}$ as represented as Equation 2.

$$\gamma_i^{(t)} = \sigma(W_\gamma^T m_i^{(t)} + b_\gamma)$$

$$g_i^{(t)} = a_i^{(t)} - \gamma_i^{(t)} v_i^{(t-1)}$$

$$\pi(i|[M^{(t)},e^{(t)}];\theta) = \text{softmax}(g_i^{(t)}) \quad \text{[Equation 2]}$$

In Equation 2, $i \in [1,N]$ denotes a memory index, $W_\gamma \in R^{1 \times d}$ and $b\gamma \in R$ denote a weight matrix and a bias term, respectively, $\sigma(\cdot)$ and softmax($\cdot$) denote a sigmoid function and a softmax function, respectively, and n denotes a memory scheduling agent policy.

EMR-biGRU: A major drawback of EMR-Independent is that evaluation of each memory depends only on an input $x^{(t)}$. That is, the importance may be computed between each memory entry and a new data instance regardless of other entries in a corresponding memory. However, this scheme may not model relative importance of each memory entry to other memory entries, which is more importance in determining a least important memory. One method of considering a relative relationship between memory entries is to perform encoding using bidirectional GRU (biGRU) as represented as Equation 3.

$$\vec{h}_i^{(t)} = GRU_{\theta_{fw}}(m_i^{(t)}, \vec{h}_{i-1}^{(t)})$$

$$\overleftarrow{h}_i^{(t)} = GRU_{\theta_{bw}}(m_i^{(t)}, \overleftarrow{h}_{i+1}^{(t)})$$

$$h_i^{(t)} = [\vec{h}_i^{(t)}, \overleftarrow{h}_i^{(t)}]$$

$$\pi(i|[M^{(t)},e^{(t)}];\theta) = \text{softmax}(MLP(h_i^{(t)})) \quad \text{[Equation 3]}$$

In Equation 3, $i \in [1,N+1]$ denotes a memory index that includes an index of an encoded input $m_{N+1}^{(t)}=e^{(t)}$, $GRU_\theta$ denotes a Gated Recurrent Unit parameterized by $\theta$, [$\vec{h}_i^{(t)}$, $\overleftarrow{h}_i^{(t)}$] denotes a concatenation of features, and MLP denotes a multi-layer perceptron having three layers with ReLU activation functions. Thus, EMR-biGRU learns the general importance of each memory entry in relation to its neighboring networks rather than independently computing importance of each memory entry with respect to the query, which is useful when selecting tmost important entries among highly similar data instances, for example, video frames. However, the model may not effectively model a long-range relationship between memory entries in far-away slots due to inherent limitation within RNNs.

EMR-Transformer: To overcome suboptimality RNN-based modeling, a self-attention mechanism may be additionally adopted. With query $Q^{(t)}$, key $K^{(t)}$, and value $V^{(t)}$, relative importance of memory entries with a linear layer that takes $m^{(t)}$ with position encoding is proposed as an input. With multi-headed attention, each component may be projected onto a multi-dimensional space; dimensions for the respective components are $Q^{(t)} \in R^{H \times N \times k/H}$, $K_{(t)} \in R^{H \times N \times k/H}$, and $V(t) \in R^{H \times N \times k/H}$. Here, N denotes a size of the memory and H denotes a number of attention heads. Using them, the retrieved output may be formulated using self-attention and memory encoding as represented as Equation 4.

$$A^{(t)} = \text{softmax}\left(\frac{Q^{(t)} K^{(t)T}}{\sqrt{k/H}}\right) \quad \text{[Equation 4]}$$

$$o^{(t)} = A^{(t)} V^{(t)}$$

$$h^{(t)} = W_o^T[o_1^{(t)}, o_2^{(t)}, \ldots, o_h^{(t)}]$$

$$\pi(i|[M^{(t)}, e^{(t)}]; \theta) = \text{softmax}(MLP(h_i^{(t)}))$$

In Equation 4, 1 denotes a memory index, $o_i^{(t)} \in R^{N \times d/h}$, $[o_1^{(t)}, o_2^{(t)}, \ldots, o_h^{(t)}] \in R^{N \times k}$ denotes a concatenation of $o_i^{(t)}$, $\pi$ denotes an agent policy, and MLP denotes the same 3-layer multi-layer perceptron used in EMR-biGRU.

Memory encoding $h^{(t)}$ may be computed using a linear function $W_0 \in R^{d \times d}$ with $h^{(t)}$ as an input. FIG. 4 illustrates an example of an architecture of a memory encoder according to an example embodiment, for example, an example of an architecture of a memory encoder for EMR-independent and EMR-biGRU/Transformer.

Describing the value network, future importance of each memory entry needs to be considered to solve a specific QA problem. In particular, in a textual QA task (e.g., TriviaQA), storing evidence sentences that precede span words may be useful in providing a useful context. However, using only a discrete policy gradient method, such context instances may not be preserved. To overcome the above issue, an actor-critic RL method (A3C) may be used to estimate a sum of future rewards at each state using the value network. A difference between a policy and a value lies in that a value may be differently estimated at each timestep and needs to consider the entire memory. To obtain a holistic representation of a memory, Deep Sets (Manzil Zaheer, Satwik Kottur, Siamak Ravanbakhsh, Barnab'as P'oczos, Ruslan R. Salakhutdinov, and Alexander Smola, 2017, Deep sets. In Advances in Neural Information Processing Systems 30: Annual Conference on Neural Information Processing Systems 2017.) may be used. Herein, according to the Deep Sets, all $h_i^{(t)}$ may be summed up and input to an MLP($\varphi$ that includes two linear layers and an ReLU activation function, to obtain a set representation. Subsequently, a set representation $\rho(\Sigma_{i=1}^N h_i^{(t)})$ may be further processed by a GRU with a hidden state from a previous timestep. Finally, an output of the GRU may be fed to a multi-layer perceptron to estimate a value $V^{(t)}$ for a current timestep.

Training and Test

A model disclosed herein learns a memory scheduling policy jointly with the model to solve a task. For EMR training, A3C or REINFORCE may be selected. At a training time, since a task is given, a question may be provided to an agent at every timestep. At each step, the agent may select an action stochastically from multinomial distribution based on $\pi(i|[M^{(t)}, e^{(t)}];\theta)$ and may explore various states and perform an action, Subsequently, a QA model may provide the agent with a reward $R_t$. An asynchronous multiprocessing method may be used to train a plurality of models at once.

At a test time, the agent may delete a memory index based on the learned policy $\pi$: $\arg \max_i(i|[M^{(t)}, e^{(t)}];\theta)$. Contrarily from a training step, the model may observe a question only at the end of a data stream. When encountering the question, the model may solve the task using data instances stored in the external memory.

The method according to example embodiments may read/write a large amount of data without being limited by hardware by providing a memory-based reinforcement learning model capable of storing optional information in streaming data.

Also, in the method according to some example embodiments, since semantic information in a large amount of data provided from a user is stored in a memory, it is possible to use the semantic information for a conversation model interactable with the user in real time and since data is input in a streaming manner, it is possible to process data regardless of an amount of data and to effectively use a hardware memory.

Figure 5:
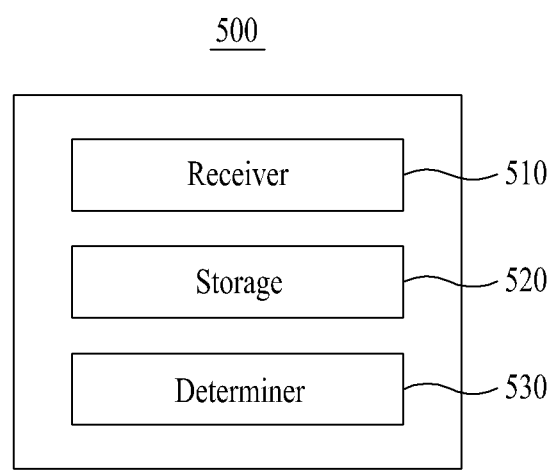
FIG. 5 is a diagram illustrating an example of a QA system using memory-based reinforcement learning according to an example embodiment.

FIG. 5 is a diagram illustrating an example of a configuration of a QA system using memory-based reinforcement learning according to an example embodiment.

Referring to FIG. 5, a system 500 may include a receiver 510, a storage 520, and a determiner 530.

The receiver 510 may receive, in an EMR, streaming data about an input context that is input from a user.

The storage 520 may analyze, in the EMR, the received streaming data and store preset semantic information used for QA in an external memory.

Here, the storage 520 may encode each data instance including the streaming data to a memory vector representation, may acquire relative importance with data stored in the external memory using the encoded memory vector representation, and when the acquired relative importance is higher than specific data stored in the external memory, may replace the specific data with data about the semantic information and store the replaced data.

Here, when a memory entry of the external memory is empty, the storage 520 may map and store the semantic information to the empty memory entry. When a memory entry of the external memory becomes full, the storage 520 may compute relative importance between the semantic information and data stored in the external memory and replace specific data stored in a memory entry corresponding to lowest relative importance compared to the semantic information with the semantic information and store the replaced semantic data.

Here, the storage 520 may compute a replacement probability between the semantic information and each memory entry of the external memory based on a preset memory scheduling agent policy and may replace data stored in one of memory entries with the semantic information based on the computed replacement probability and store the replaced semantic information.

Here, the storage 520 may store the semantic information in the external memory through a reinforcement learning model that is trained through reinforcement learning using a preset training dataset.

In response to an input of a question from the user, the determiner 520 may determine, in a pretrained QA model, an answer to the input question based on semantic information stored in the external memory.

Although corresponding description is omitted in the system of FIG. 5, it will be apparent to those skilled in the art that description made above related to the method of FIGS. 1 to 4 may apply to the system of FIG. 5.

The systems and/or apparatuses described herein may be implemented using hardware components, software components, and/or a combination thereof. For example, a processing device and components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. Here, the media may be to continuously store a computer-executable program or to temporarily store the same for execution or download. Also, the media may include, alone or in combination with the program instructions, data files, data structures, and the like. The media and program instructions may be those specially designed and constructed for the purposes, or they may be of the kind well-known and available to those having skill in the computer software arts, Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A question-answering (QA) method using memory-based reinforcement learning, the method comprising:
   receiving, in an episodic memory reader (EMR), streaming data about an input context that is input from a user;
   analyzing, in the EMR, the received streaming data and storing preset semantic information used for QA in an external memory, wherein the storing comprises, in response to an empty memory entry of the external memory, mapping and storing the semantic information to the empty memory entry, and, in response to a full memory entry of the external memory, computing relative importance between the semantic information and data stored in the external memory and replacing specific data stored in a memory entry corresponding to lowest relative importance compared to the semantic information with the semantic information and storing the replaced semantic data; and,
   in response to an input of a question from the user, determining, in a pretrained QA model, an answer to the input question based on semantic information stored in the external memory.

2. The method of claim 1, wherein the storing comprises encoding each data instance comprising the streaming data to a memory vector representation, acquiring relative importance with data stored in the external memory using the encoded memory vector representation, and, in response to the acquired relative importance being higher than specific data stored in the external memory, replacing the specific data with data about the semantic information and storing the replaced data.

3. The method of claim 1, wherein the storing comprises computing a replacement probability between the semantic information and each memory entry of the external memory based on a preset memory scheduling agent policy and replacing data stored in one of memory entries with the semantic information based on the computed replacement probability and storing the replaced semantic information.

4. The method of claim 1, wherein the storing comprises storing the semantic information in the external memory through a reinforcement learning model that is trained through reinforcement learning using a preset training dataset.

5. A question-answering (QA) method using memory-based reinforcement learning, the method comprising:
   receiving, in an episodic memory reader (EMR), streaming data about an input context that is input from a user;
   analyzing, in the EMR, the received streaming data and acquiring preset semantic information used for QA, and replacing a single piece of specific data of data stored in an external memory with the semantic information and storing the replaced semantic information, wherein the storing comprises, in response to an empty memory entry of the external memory, mapping and storing the semantic information to the empty memory entry, and, in response to a full memory entry of the external memory, computing relative importance between the semantic information and data stored in the external memory and replacing specific data stored in a memory entry corresponding to lowest relative importance compared to the semantic information with the semantic information and storing the replaced semantic data; and,
   in response to an input of a question from the user, determining, in a pretrained QA model, an answer to the input question based on semantic information stored in the external memory.

6. The method of claim 5, wherein the storing comprises encoding each data instance comprising the streaming data to a memory vector representation, acquiring relative importance with data stored in the external memory using the encoded memory vector representation, and, in response to the acquired relative importance being higher than the single piece of specific data stored in the external memory, replacing the specific data with data about the semantic information and storing the replaced data.

7. A question-answering (QA) system using memory-based reinforcement learning, the system comprising:
   a receiver configured to receive, in an episodic memory reader (EMR),
   streaming data about input context that is input from a user;
   a storage configured to analyze, in the EMR, the received streaming data and store preset semantic information used for QA in an external memory, wherein the storage is configured to, in response to an empty memory entry of the external memory, map and store the semantic information to the empty memory entry, and to, in response to a full memory entry of the external memory, compute relative importance between the semantic information and data stored in the external memory and replace specific data stored in a memory entry corresponding to lowest relative importance compared to the semantic information with the semantic information and store the replaced semantic data; and
   a determiner configured to, in response to an input of a question from the user, determine, in a pretrained QA model, an answer to the input question based on semantic information stored in the external memory.

8. The system of claim 7, wherein the storage is configured to encode each data instance comprising the streaming data to a memory vector representation, to acquire relative importance with data stored in the external memory using the encoded memory vector representation, and to, in response to the acquired relative importance being higher than specific data stored in the external memory, replace the specific data with data about the semantic information and store the replaced data.

9. The system of claim 7, wherein the storage is configured to compute a replacement probability between the semantic information and each memory entry of the external memory based on a preset memory scheduling agent policy and to replace data stored in one of memory entries with the semantic information based on the computed replacement probability and store the replaced semantic information.

10. The system of claim 7, wherein the storage is configured to store the semantic information in the external memory through a reinforcement learning model that is trained through reinforcement learning using a preset training dataset.

* * * * *